United States Patent [19]

Sulzer et al.

[11] 3,899,391

[45] Aug. 12, 1975

[54] CONTAINMENT VESSEL CONSTRUCTION FOR NUCLEAR POWER REACTORS

[75] Inventors: Hans D. Sulzer, Winterthur, Switzerland; Joseph L. Coletti, Quincy, Mass.

[73] Assignee: Stone & Webster Engineering Corporation, Boston, Mass.

[22] Filed: June 12, 1973

[21] Appl. No.: 369,186

Related U.S. Application Data

[63] Continuation of Ser. No. 74,796, Sept. 23, 1970, abandoned, which is a continuation-in-part of Ser. No. 717,078, March 29, 1968, abandoned.

[52] U.S. Cl. ..................... 176/37; 176/38; 176/87
[51] Int. Cl. ............................................... G21c 9/00
[58] Field of Search ........................... 176/37, 38, 87

[56] References Cited
UNITED STATES PATENTS

| | | | |
|---|---|---|---|
| 3,438,857 | 4/1969 | Sulzer | 176/37 |
| 3,454,466 | 7/1969 | Pitt et al. | 176/38 |
| 3,513,070 | 5/1970 | Margen et al. | 176/38 |

OTHER PUBLICATIONS
U.S. Reactor Containment Technology, Vol. II, 1965, Edited by Cottrell et al., pp. 7.4, 7.9, 7.27, 7.95, 7.132, 7.137, 8.53, 8.56, 9.2, 9.13, 10.9, 7.92.

*Primary Examiner*—Harvey E. Behrend
*Attorney, Agent, or Firm*—Morgan, Finnegan, Pine, Foley & Lee

[57] ABSTRACT

A nuclear containment vessel houses an inner reactor housing structure whose outer wall is closely spaced from the inner wall of the containment vessel. The inner reactor housing structure is divided by an intermediate floor providing an upper chamber for housing the reactor and associated steam generators and a lower chamber directly therebeneath containing a pressure suppression pool. Communication between the upper chamber and the pressure suppression pool is established by conduits extending through the intermediate floor which terminate beneath the level of the pressure suppression pool and by inlet openings in the reactor housing wall beneath the level of the pressure suppression pool which communicate with the annulus formed between the outer wall of the reactor housing structure and the inner wall of the containment vessel. The inner reactor housing structure is preferably constructed of reinforced concrete and the intermediate floor and the outer wall thereof surrounding the lower chamber are preferably faced with a continuous steel lining so as to be substantially gas-tight.

4 Claims, 2 Drawing Figures

INVENTORS
HANS D. SULZER
JOSEPH L. COLETTI
BY
Morgan, Finnegan, Durham & Pine
ATTORNEYS

CONTAINMENT VESSEL CONSTRUCTION FOR NUCLEAR POWER REACTORS

CROSS-REFERENCES TO RELATED APPLICATIONS

This is a continuation of application Ser. No. 74,796, filed Sept. 23, 1970, now abandoned, which, in turn, is a continuation-in-part of Ser. No. 717,078, filed Mar. 29, 1968, now abandoned.

BACKGROUND AND OBJECTS OF THE INVENTION

This invention relates to nuclear reactors and, more particularly, to the constructional features of containment vessels for the housing of such reactors, including safeguards for obtaining suppression of excessive pressure in the event of nuclear incidents.

Nuclear reactor systems of the pressurized water or boiling water types are generally enclosed with a secondary or vapor containment structure designed to withstand the maximum pressure buildup which might be obtained as a result of an accident within the reactor. Such accidents may be due to the rupture of the coolant line or reactor vessel, causing sudden vaporization of the water. There is also the possibility of the release of hydrogen gas due to chemical reaction of the core material and the metal cladding with the high temperature water. It is essential that such gases and vapors be contained within the reactor and the pressure be reduced so as not to exceed the limits predetermined by the structural design thereof. The safety of nuclear power reactors is based on the principle that in case of an accident accompanied by the release of radioactive fission products, all contaminated gases, liquids, and solids must be contained in a leak-tight vessel until the radioactivity level has substantially decreased.

The most common solution to the problem of containment is to build a vessel around the nuclear reactor and primary coolant system of sufficient volume to hold, under moderate pressure, the flashing coolant escaping out of a major break. This concept of containment leads to very large leak-tight vessels with high material and erection costs. Different means of reducing the size and, therefore, the cost of the containment vessel have been proposed. The most promising is the so-called pressure suppression concept which is generally feasible for water-cooled reactors. The pressure suppression containment concept is based on the fact that, following an accident, the pressure of the containment vessel is reduced by quenching the escaping steam and water in a cold water pool located next to the containment vessel.

While such "pressure suppression" technique is well adapted to the boiling water reactor, it has not been used for pressurized water reactors. This is due to the fact that the primary coolant system of pressurized water reactors includes large heat exchangers located above the reactor nozzle level. This arrangement of the components of the primary coolant system makes it difficult to realize the tight layout required for the pressure suppression scheme.

It is, therefore, a primary objective of the invention to provide a novel containment structure for nuclear power reactors which is simple in construction and adaptable for the utilization of the pressure suppression system.

Another object of this invention is to provide a novel containment structure for a nuclear power reactor which includes new and improved means for achieving pressure suppression in the event of a vapor or steam-producing reactor accident.

Another object of this invention is to provide a novel nuclear reactor containment structure which permits a reduction in size and volume and consequent savings in material and labor.

Another object of this invention is to provide a novel nuclear reactor containment structure having increased leaktightness which results in greater safety of operation.

Another object of the invention is to provide a novel nuclear reactor containment structure which requires very little excavation and, therefore, can be built on a site where the rock bed is very near the ground grade.

Another object of the invention is to provide a novel nuclear reactor containment structure which permits utilization of an access door located at ground level for installation of the heavy equipment.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the present invention is embodied in a novel containment structure and various constructional features thereof. It consists essentially of an outer vessel of cylindrical shape having walls made of reinforced concrete and a dome-shaped top, erected on a platform of reinforced concrete. The inner wall is lined with steel, the lining extending over the platform.

Inside the above described structure is a cylindrical housinig of a smaller diameter than the inner diameter of the vessel so that a space of annulus is provided which allows the passage of gases or steam which may escape in case of a break in the coolant system. This inner housing is divided by a horizontal floor into an upper and lower chamber. Of these, the upper chamber has a central compartment for housing the reactor proper and lateral compartments for housing the steam generator. The lower chamber constitutes a pressure suppression room, communicating through suitable inlet openings at the bottom with the annulus or space between the vessel and the reactor housing structure. A series of conduits from the reactor compartment extend downwardly and terminate near the floor of the lower chamber. The latter is filled with a suitable condensing liquid, such as water, to a level at least above that of the inlet openings, to thereby form a pressure suppression pool. In this manner, a portion of the steam or gases is brought directly from the reactor compartment in contact with the quenching water pool, but the major part of the steam flows through the annular space.

Advantageously, and as here preferably embodied, the inner reactor housing structure is constructed of reinforced concrete and the intermediate floor and the outer wall thereof surrounding the lower chamber are advantageously suitably faced with a continuous steel lining so as to be substantially gas-tight.

With the pressure suppression pool being located inside the containment vessel and the lining, in case of accident all contaminated liquids and gases will remain in the vessel itself.

The containment vessel, constructed in accordance with the invention, requires little excavation and can, therefore, be built on a site where the rock bed is very near the ground grade. This is made possible by the use of an access door on the level of the floor of the lower chamber. All heavy equipment, like the reactor, steam generator, etc. may be brought into the containment vessel and skidded on the lower floor to a space where they can be lifted through temporary openings provided in the concrete floor separating the two chambers.

It will be understood that the foregoing general description and the following detailed description as well are exemplary and explanatory of the invention but are not restrictive thereof.

The accompanying drawings, referred to herein and constituting a part hereof, illustrate one embodiment of the invention, and together with the description, serve to explain the principles of the invention.

DESCRIPTION OF THE PREFERRED EMBODIMENT

Figure 1:
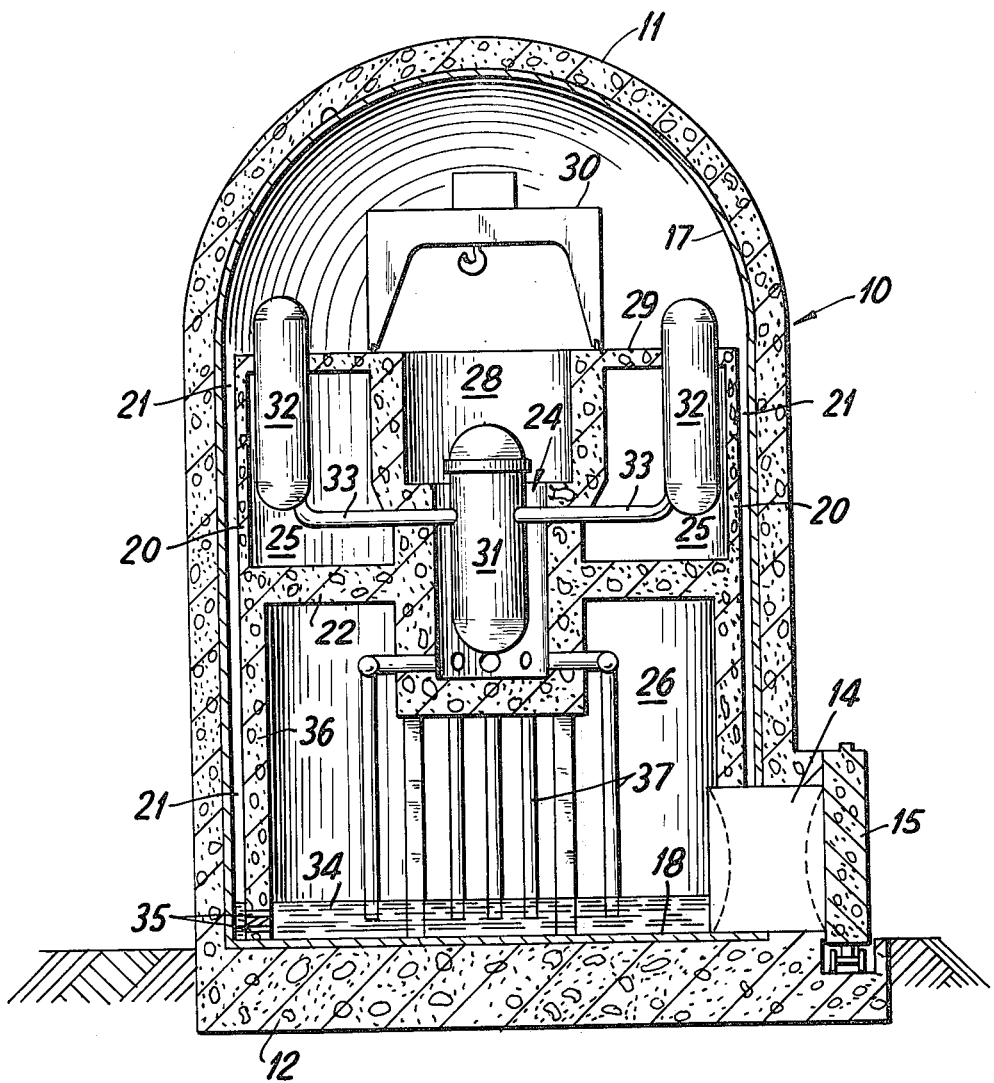
FIG. 1 is a view in front elevation, partly in section and partly schematic, of a nuclear reactor containment vessel constructed in accordance with the invention, illustrating the disposition of the reactor housing structure within the containment vessel.

Referring now to the accompanying drawings and particularly to FIG. 1, the structure shown comprises a vertically extending containment vessel 10 which has a dome portion 11 of hemispherical shape. Since no underground installation is needed in the structure herein shown, the vessel 10 may be erected over a relatively shallow platform 12 which is imbedded in the ground. At one side, immediately above the ground, an acess opening 14 is provided, the purpose of which will be explained later. A door 15 effects the closure of the access opening 14.

The containment vessel structure 10 is preferably made of reinforced concrete, as well as the platform 12 on which it stands. The same material advantageously may be used for the door 15. On its inner face, the containment vessel 10 is advantageously covered with a steel lining 17 which is in intimate contact with the wall and, therefore, will not be stressed by the internal pressure. A similar steel plate 18 covers the top of the platform 12. Steel linings 17, 18, vessel 10 and platform 12 combine to provide a substantially impervious barrier for preventing contaminated products from entering the atmosphere, as is well known to the art. It will be understood, however, that containment vessel 10 may be of any suitable construction and thus may be of the "double-containment" type, as disclosed in U.S. Pat. NOS. 3,320,969 and 3,322,141. Other forms of construction will be apparent to those of ordinary skill in the art.

Within the containment vessel 10, and erected on the platform 12, is the nuclear reactor housing structure 20. It is of a cylindrical configuration and has an outside diameter smaller than the space defined by the steel liners 17. In this manner, an annular space 21 is provided which surrounds the entire housing 20. The latter is divided by an intermediate floor 22 into an upper chamber which has a central compartment 24 and a lateral compartment 25, and a lower chamber 26. The central compartment 24 has a wider open portion 28 which communicates with the space under the dome 11. The lateral compartment 25 is closed on the top by the operating floor 29 which supports a traveling gantry crane 30.

The central compartment 24 houses the reactor 31, whereas the lateral compartment 25 houses the steam generators 32, suitably interconnected by conduits 33.

In accordance with the invention, lower chamber 26 comprises the pressure suppression room. It is an accumulation room for the air or steam that may be carried over from the upper chamber. For this purpose, a series of radially distributed inlet openings 35 are placed in the wall 36 of the housing 20 to establish communication between the annular space 21 and the lower chamber 26. Additional communication is established between the central compartment 24 and the chamber 26 by means of a series of radially spaced conduits 37, which terminate near the bottom of the chamber 26 above the lining 18. Chamber 26 is flooded with a quenching liquid, such as, for example, water, so as to provide a pressure suppression pool 34. Advantageously, pool 34 is maintained at a level at least above that of the inlet openings 35 and above the terminal end of the conduits 37.

In accordance with the invention as preferably embodied, intermediate floor 22 and the portion of wall 36 which surrounds the lower chamber 26 are substantially gas-tight to thereby constitute a barrier to the passage of gases and vapors therethrough. The inner reactor housing structure is preferably constructed of reinforced concrete and, to the above end, intermediate floor 22 and the portion of wall 36 surrounding the lower chamber 26 are advantageously faced with a continuous steel lining as shown at 22a, 36a, respectively.

It will be apparent from the foregoing that, during normal operation of the reactor, the leak-tight construction prevents the escape of contaminated gases and thus the containment vessel 10 serves also as a biological shield. In case of an accident, such as leakage in the primary coolant system, the pressure will rise in the upper chamber due to the sudden vaporization of the escaping water and the steam produced passes through the annular space 21, entering the lower chamber 26 through openings 35 to be quenched by the pressure suppression pool 34. In addition, excess pressure in the compartment 24 is reduced by virtue of the steam escaping through the conduits 37 into the pressure suppression pool 34.

It will also be seen from the foregoing that the invention here embodied provides a pressure suppression arrangement in which the pressure suppression pool is located directly beneath the reactor vessel and its associated auxiliary equipment, such as steam generators and the like, and in which the pressure-receiving outer wall of the reactor housing structure extends in a substantially continuous line from top to bottom. This arrangement eliminates or substantially minimizes discontinuities in the housing structure for the reactor vessel and pressure suppression pool and, consequently, has been found to have a very significant economic advantage in permitting the housing to be constructed from reinforced concrete, rather than structural steel.

A further significant advantage of the invention as here embodied is that it permits gases and vapors produced as a result of an accident in the upper chamber to be conducted downwardly into the pressure suppression pool a short distance beneath the surface thereof. This results in a significant reduction in the peak pressure of the gases and vapors which is required in order to initiate flow thereof — and, hence, to initiate operation of the system — into the pressure suppression pool.

Figure 2:
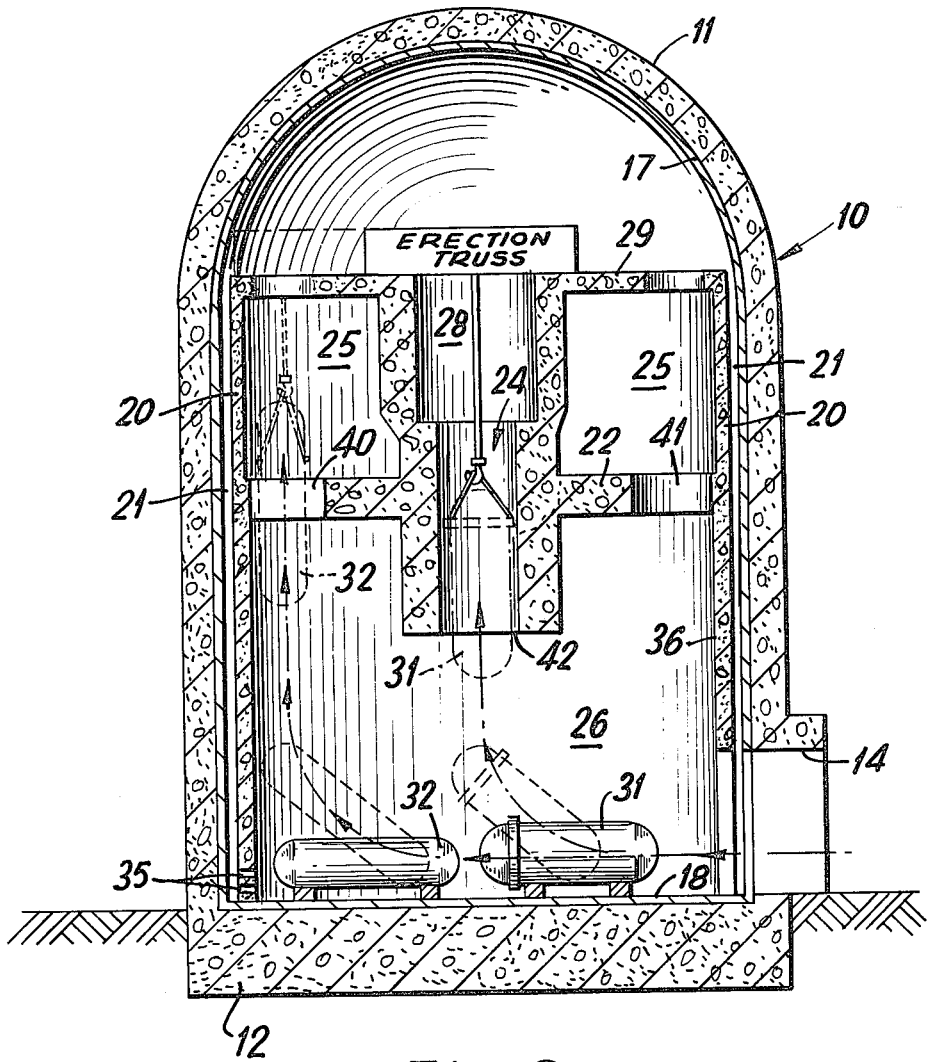
FIG. 2 is a view in front elevation, partly in section and partly schematic, of the structure of FIG. 1 in the process of erection, illustrating the access and placement of the reactor component elements.

In FIG. 2 of the accompanying drawing, there is shown, in schematic illustration, the method for the installation of the heavy equipment through the access opening 14 during the contruction of the containment vessel. For this purpose, temporary openings 40, 41, and 42 are provided in the intermediate floor 22 and the central compartment 25, respectively. A temporary erection truss above the operating floor 29 provides for the suspension and lifting of the reactor 31 and the steam generators 32 which are conveniently brought in through the access opening 14 and skidded on the lower floor, i.e., the steel lining 18 of the platform 12. Once these components are in place, the temporary openings 40, 41 and 42 are closed and further construction may proceed with the heavy equipment in place and permanently installed.

The invention in its broader aspects is not limited to the specific embodiment herein shown and described but departures may be made therefrom within the scope of the accompanying claims, without departing from the principles of the invention and without sacrificing its chief advantages.

What is claimed is:

1. A containment vessel construction for nuclear power reactors with pressure suppression, comprising:
   outer containment means for housing a nuclear reactor vessel and associated steam generators;
   an inner housing structure within said outer containment means,
      said inner housing structure having an outer wall secured to the floor of said outer containment means and extending upwardly therefrom in closely-spaced relationship to the inner peripheral surface of said outer containment means to form a relatively small annulus therebetween;
   said inner housing structure divided by a gas-tight intermediate floor member into upper and lower chambers, said upper chamber being in open communication with the space contained by said outer containment means and also with said annulus;
   said outer wall of inner housing structure extending in a substantially continuous, straight, vertical line from the portion thereof surrounding said upper chamber to the portion thereof surrounding said lower chamber, said portion of said outer wall of said inner housing structure surrounding said lower chamber being gas-tight;
   said nuclear reactor vessel and associated steam generators mounted within said upper chamber;
   a pressure suppression pool provided in said lower chamber directly beneath said upper chamber;
   a plurality of inlet openings distributed in the lower portion of said outer wall of said inner housing structure communicating said lower chamber with said annulus; and
   said pressure suppression pool contained in said lower chamber extending to a level at least above said inlet openings, whereby in the event of a vapor and gas producing accident within said upper chamber said gases and vapors are conducted upwardly into said space contained by said outer containment means and thence downwardly through said annulus and said inlet openings into said pressure suppression pool.

2. Apparatus as defined in claim 1, including
   a plurality of conduit means extending through said intermediate floor member and terminating in a general vertical portion within said pressure suppression pool,
      whereby in the event of a vapor and gas producing accident within said upper chamber, said gases and vapors are also conducted downwardly through said conduit means into said pressure suppression pool.

3. Apparatus as defined in claim 1, wherein
   said inner housing structure and intermediate floor member are constructed of reinforced concrete, and including a gas-tight vapor-impervious lining extending continuously along the portion of the outer wall of said inner housing structure surrounding said lower chamber and also extending continuously between said upper and lower chambers.

4. Apparatus as defined in claim 2, wherein
   said upper chamber is divided into a central cylindrical compartment for housing said nuclear reactor vessel and into a lateral compartment for housing said associated steam generators,
      said central compartment being in open communication with the space contained by said containment means; and
   said plurality of conduit means and radially distributed about the periphery of said central compartment, thereby communicating the interior thereof with said pressure suppression pool.

* * * * *

UNITED STATES PATENT AND TRADEMARK OFFICE
CERTIFICATE OF CORRECTION

PATENT NO. : 3,899,391
DATED : August 12, 1975
INVENTOR(S) : Hans D. Sulzer and Joseph L. Coletti It is certified that error appears in the above-identified patent and that said Letters Patent are hereby corrected as shown below:

Column 6, line 2, after "of" insert -- said --.

Signed and Sealed this ninth Day of December 1975

[SEAL]

Attest:

RUTH C. MASON
Attesting Officer

C. MARSHALL DANN
Commissioner of Patents and Trademarks